(12) United States Patent
Muneyoshi (10) Patent No.: US 12,092,224 B2
(45) Date of Patent: Sep. 17, 2024

(54) LINED BUTTERFLY VALVE AND METHOD FOR MANUFACTURING LINED BUTTERFLY VALVE

(71) Applicant: KITZ CORPORATION, Chiba (JP)

(72) Inventor: Takanori Muneyoshi, Chino (JP)

(73) Assignee: KITZ CORPORATION, Tokyo (JP)

( * ) Notice: Subject to any disclaimer, the term of this patent is extended or adjusted under 35 U.S.C. 154(b) by 0 days.

(21) Appl. No.: 17/787,682

(22) PCT Filed: Dec. 28, 2020

(86) PCT No.: PCT/JP2020/049091
§ 371 (c)(1),
(2) Date: Jun. 21, 2022

(87) PCT Pub. No.: WO2021/132712
PCT Pub. Date: Jul. 1, 2021

(65) Prior Publication Data
US 2023/0008981 A1   Jan. 12, 2023

(30) Foreign Application Priority Data

Dec. 27, 2019 (JP) .................................. 2019-238703

(51) Int. Cl.
*F16K 1/22* (2006.01)
*B21K 1/20* (2006.01)

(52) U.S. Cl.
CPC ................ *F16K 1/222* (2013.01); *B21K 1/20* (2013.01); *F16K 1/224* (2013.01)

(58) Field of Classification Search
CPC ...... F16K 1/222; F16K 1/224; F16K 27/0218; F16K 27/0272; B21K 1/20; Y10T 137/7036; Y10T 137/0525

(Continued)

(56) References Cited

U.S. PATENT DOCUMENTS 3,186,682 A * 6/1965 Pierson ................. F16K 1/2268
251/306
3,565,394 A * 2/1971 Smith ................... F16K 1/2265
251/151

(Continued)

FOREIGN PATENT DOCUMENTS

GB    1488387 A  * 10/1977
JP    62-46862       3/1987

(Continued)

OTHER PUBLICATIONS

International Search Report issued Mar. 23, 2021 in International Application No. PCT/JP2020/049091.

*Primary Examiner* — John Bastianelli
(74) *Attorney, Agent, or Firm* — Wenderoth, Lind & Ponack, L.L.P.

(57) ABSTRACT

A lined butterfly valve and manufacturing method, the lined butterfly valve including a valve disk (2) with a core metal (20) covered with a lining layer (22) provided rotatably inside a body (3) by a stem (5). The lining layer includes a front/back-side lining part (32) provided on each of front and back sides of the core metal and an outer circumferential lining part (33) provided on an outer circumferential side of the core metal. The front/back-side lining part is provided on each of the front and back sides of the core metal in which no occurrence of warpage is assumed so as to have a thickness T1, and the outer circumferential lining part has a thickness T2 from an outer circumferential end of the core metal to a tip seal surface of an outer circumferential end of the valve disk.

9 Claims, 6 Drawing Sheets

(58) Field of Classification Search
USPC .................................. 251/305–308; 137/375
See application file for complete search history.

(56) References Cited

U.S. PATENT DOCUMENTS

| | | | | |
|---|---|---|---|---|
| 3,670,071 A | * | 6/1972 | Walchle | F16K 27/0209 264/273 |
| 3,784,157 A | * | 1/1974 | Wenglar | F16K 1/2265 251/173 |
| 3,991,974 A | * | 11/1976 | Bonafous | F16K 1/2265 251/192 |
| 4,106,170 A | * | 8/1978 | Schoeneweis | F16K 1/48 403/166 |
| 4,259,980 A | * | 4/1981 | Muller | B29C 45/1671 251/306 |
| 4,674,528 A | | 6/1987 | Nishio et al. | |
| 4,759,530 A | * | 7/1988 | Iff | F16K 1/2265 251/306 |
| 6,901,942 B2 | * | 6/2005 | Krimmer | F02D 9/101 251/305 |
| 8,430,113 B2 | * | 4/2013 | Suetome | B29C 45/1459 251/305 |
| 9,995,399 B2 | * | 6/2018 | Zhang | F16K 1/222 |

FOREIGN PATENT DOCUMENTS

| | | |
|---|---|---|
| JP | 2-58174 | 4/1990 |
| JP | 10-141514 | 5/1998 |
| JP | 11-218234 | 8/1999 |
| JP | 3086783 | 9/2000 |
| JP | 3877885 | 2/2007 |
| JP | 6495243 | 4/2019 |
| WO | WO 2019208910 A1 * | 10/2019 |

* cited by examiner

LINED BUTTERFLY VALVE AND METHOD FOR MANUFACTURING LINED BUTTERFLY VALVE

TECHNICAL FIELD

The present invention relates to a lined butterfly valve in which a valve disk and an inner circumferential surface of a valve box are resin-lined, and a method of manufacturing the lined butterfly valve.

BACKGROUND ART

For example, when a highly-corrosive fluid is caused to flow in a chemical plant or the like or as a butterfly valve for a food-related flow path, a so-called lined butterfly valve is often used which has a resin-lined metal-made core metal of a valve disk and has a resin seat ring attached on an inner circumferential surface of a valve box. In the valve of this type, normally, as a lining material, a fluororesin excellent in chemical resistance and heat resistance is used. This fluororesin is subjected to lining process, with a thickness on a certain degree to prevent permeation and penetration of a special fluid such as a chemical. On the other hand, fluororesin also has a property of low elasticity. Thus, at the timing when the valve is closed, it is desired to sufficiently ensure sealability between, in particular, a valve blade side in the valve disk and a portion near a seal part with a valve box side and, in turn, to prevent leakage over the entire circumference of the seal part on the outer circumferential side of the valve disk.

As a lined butterfly valve, for example, the Applicant has filed an application of the butterfly valve in PTL 1. In this valve disk of the valve, the disk-shaped core metal is provided with disk lining with fluororesin. This disk lining has a mildly tilted surface on each of both surface sides and, contiguously to this tilted surface, a taper surface having a predetermined angle is formed on a tip side of the valve blade. Between these taper surfaces on both surfaces, a seal part is provided which makes pressure-contact with and seals a seat liner when the valve is closed. These tilted surface, taper surface, and seal part are formed of the core metal and having a substantially equal material thickness. When the valve is closed, a high seal surface pressure is exerted to prevent leakage.

On the other hand, in the valve disk of the butterfly valve in PTL 2, a lining layer covers the outside of the reinforcing core metal. On the outer circumferential edge of this lining layer, a seal part with two stages having different radiuses of curvature is formed, the seal part being formed of a low-pressure seal part with a small radius of curvature and a middle-pressure or high-pressure seal part with a large radius of curvature. With this seal part, only the low-pressure seal part makes a pressure contact with the seat ring with a small bite at the time of low pressure, and the low-pressure seal part and the middle-pressure or high-pressure seal part makes a pressure contact with the seat ring with a large bite at the time of high pressure, thereby trying to reduce loads on the covering material.

When resin lining is provided to the core metal of these lined butterfly valves of PTL 1 and PTL 2, a lining molding die is generally used. When lining process is performed with the lining molding die, normally, the core metal is supported in a lateral orientation inside the molding die and, in this state, a lining material is injected to a cavity to perform lining process on the entire surface including the front and back surfaces of the core metal to produce the valve disk.

CITATION LIST

Patent Literatures

PTL 1: Japanese Patent No. 6495243
PTL 2: Japanese Patent No. 3086783

SUMMARY OF INVENTION

Technical Problem

However, when the lined butterfly valves of PTL1 and PTL 2 are formed to have a large diameter, the core metal of the valve disk also has a large diameter accordingly to increase weight. At the time of casing this core metal, warpage tends to occur mainly on the valve blade side. When lining is performed on the core metal with the lining molding die, a portion near the valve blade tends to flex downward by its self-weight when supporting the core metal. In lining molding, the core metal is arranged inside the resin mold and then a resin is suppled for molding. Thus, the core metal with warpage or flexure is arranged inside a resin lining having a certain outer shape. Because of these, it is difficult to provide lining uniformly on both surface sides of the core metal. In particular, on one surface side of the core metal near the valve blade, the lining thickness becomes insufficient and the core metal may be exposed to the surface and, on the other surface side, the lining thickness may be formed more than required. Of these, in a portion where the lining layer becomes insufficient, a possibility arises in which the fluid permeates or penetrates at the time of use.

In the valve disks of these valves, on the core metal, a tilted surface or taper surface on each of the front and back surface sides and a seal part for pressure contact with the seat liner are provided to have an approximately same thickness. To form these thicknesses as the same material thickness, it is required to form the core metal with high accuracy. However, to cover the surface of the core metal with the resin lining layer, variations tend to occur in resin molding. In particular, it is difficult to form a portion of the core metal near the outer circumference with a predetermined seal width. Thus, near the outer circumference of the core metal, an outer circumferential seal surface is often formed so as to extend from the front and back surfaces. In this case, in order to make the outer circumferential seal surface with a uniform predetermined width, it is required to finely set the shape of the core metal or, in some cases, in consideration of a crush margin of the outer circumferential seal surface in advance, it is required to cut out a superfluous extended portion of an outer circumferential seal portion with high accuracy.

Because of these, a lined butterfly valve has been desired in which a lining is easily formed with a thickness allowing permeation and penetration of chemical or the like to be prevented without providing of the core metal with high accuracy even if the lined butterfly valve is provided to have a large diameter, and a valve disk is provided which ensures sealability over the entire circumference when the valve is closed.

The present invention has been developed to solve the conventional problems, and has an object of providing a lined butterfly valve excellent in chemical resistance and heat resistance and in which, without provision of a core metal of a valve disk with high precision, a lining layer with a thickness sufficient for the core metal is ensured to prevent permeation and penetration of a fluid even if the valve is provided to have a large diameter, and a method of manufacturing the lined butterfly valve.

Solution to Problem

To achieve the above-described object, a first aspect of the invention is directed to a lined butterfly valve in which a valve disk with a core metal covered with a lining layer is provided rotatably inside a body by a stem, wherein the lining layer comprises s a front/back-side lining part provided on each of front and back sides of the core metal and an outer circumferential lining part provided on an outer circumferential side of the core metal, the front/back-side lining part is provided on each of the front and back sides of the core metal in which no occurrence of warpage is assumed, so as to have a thickness obtained by adding a predetermined lining thickness and a thickness equal to a maximum warp width assumed on a valve blade side of the core metal at at least an outer circumferential end position of the core metal, and the outer circumferential lining part has a thickness from an outer circumferential end of the core metal to a tip seal surface of an outer circumferential end of the valve disk being a thickness obtained by adding the predetermined lining thickness and a predetermined crush thickness.

A second aspect of the invention is directed to the lined butterfly valve, in which the outer circumferential lining part has a convex part protruding to an outer circumferential side of the valve disk, the convex part substantially annularly formed contiguously to an outer circumference of the valve disk, and an end face of the convex part on an outer circumferential side of the valve disk serves as the tip seal surface having a predetermined seal width.

A third aspect of the invention is directed to the lined butterfly valve, in which the core metal has an outer circumferential side surface part on its outermost circumference, and this outer circumferential side surface part has a width that can be opposed to a center part of the convex part in a thickness direction provided to the outer circumferential lining part even if warpage occurs with the maximum warp width assumed on the valve blade side of the core metal.

A fourth aspect of the invention is directed to the lined butterfly valve, in which each side surface part of the convex part with respect to the tip seal surface is formed of a tilted surface having an angle equal to or smaller than 10 degrees with respect to a pressure-contact seal direction of the tip seal surface.

A fifth aspect of the invention is directed to the lined butterfly valve, in which one set of washers with opposed to each other in a direction of insertion of the stem is attached in a shaft-mounting part where the stem is inserted, the one set of washers is formed of convex and concave shapes so that a surface pressure applied from the stem side to a boss part formed in the valve disk can be substantially equal even if a deviation or tilt occurs between the stem and the valve disk.

A sixth aspect of the invention is directed to the lined butterfly valve, in which the washer is formed of a convex-shaped washer including a convex spherical surface and a concave-shaped washer including a concave spherical surface with which the convex spherical surface is in surface contact, the convex-shaped washer and the concave-shaped washer are attached in a pressurized state in a mutually opposed direction by a spring-back force of a spring inserted in the shaft-mounting part.

A seventh aspect of the invention is directed to a lined butterfly valve in which a valve disk with a core metal covered with a lining layer is provided rotatably inside a body by a stem, wherein the lining layer comprises a front/back-side lining part provided on each of front and back sides of the core metal and an outer circumferential lining part provided on an outer circumferential side of the core metal, the front/back-side lining part has at least a predetermined lining thickness on each of the front and back sides of the core metal and has, at at least an outer circumferential end position of the core metal, in total on the front and back sides, a thickness obtained by doubling a thickness obtained by adding a thickness equal to a maximum warp width assumed on a valve blade side of the core metal to the predetermined lining thickness, and the outer circumferential lining part has a thickness from an outer circumferential end of the core metal to a tip seal surface of an outer circumferential end of the valve disk being a thickness obtained by adding the predetermined lining thickness and a predetermined crush thickness.

An eighth aspect of the invention is directed to a method of manufacturing the lined butterfly valve according to any one of the first through seventh aspects of the invention, wherein a stem or a stem jig is inserted in stem insertion holes provided to the core metal at opposing positions of a valve blade part of the core metal to fix the core metal and the stem or the stem jig to each other, the core metal is arranged in a space of molding a die for molding the lining layer, and, in a state in which the upper and lower stems or upper and lower stem jigs are held so that the core metal is fixed so as not to move in the molding space, a material for forming the lining layer is introduced into the molding space to form the lining layer on a surface of the core metal.

Advantageous Effects of Invention

From the first aspect of the invention, the lined butterfly valve is excellent in chemical resistance and heat resistance. The front/back-side lining part of the valve disk is provided on each of the front and back sides of the core metal in which no occurrence of warpage is assumed, so as to have a thickness obtained by adding a predetermined lining thickness and a thickness equal to a maximum warp width assumed on a valve blade side of the core metal at at least an outer circumferential end position of the core metal. Thus, even if warpage occurs in the core metal in practice, a lining portion with at least the predetermined lining thickness is ensured on the front and back sides of the valve disk. On the other hand, the outer circumferential lining part has a thickness obtained by adding the predetermined lining thickness and a lining thickness as a predetermined crush thickness. Thus, a lining portion with at least the predetermined lining thickness is ensured also on the outer circumferential side of the valve disk. Thus, even if the valve is provided to have a large diameter, a lining layer with a thickness sufficient for the core metal can be ensured to prevent permeation and penetration of the fluid. With this, without finely setting the shape of the core metal, it is possible to form the front/back-side lining part and the outer circumferential lining part each in a predetermined shape and, in particular, it is possible to easily form the outer circumferential side with the predetermined thickness and the predetermined width. With this outer circumferential side having a thickness and seal width required to ensure sealability, leakage from the outer circumferential side of the valve disk is prevented when the valve is closed and sealability can be exerted over the entire circumference of the valve disk.

From the second aspect of the invention, the convex part is formed on the outer circumferential lining part, and the end face of this convex part on the outer circumferential side serves as a tip seal surface having the predetermined seal width. Thus, irrespective of the outer diameter and thickness of the core metal, while the outer circumferential lining part is formed to have a necessary thickness, the predetermined seal width required for sealing can be provided to this convex part. Thus, even if the valve is formed to have a large diameter, the minimum-required outer circumferential seal part can be formed, and processing this part is easy.

From the third aspect of the invention, for the convex part of the outer circumferential lining part to exert favorable sealability, the outer circumferential part of the core metal preferably serves as a support. For this purpose, even if warpage occurs in the core metal, the outer circumferential side surfaces of the core metal are opposed preferably at least at the center of the convex part. In particular, a width is provided that can be opposed to the center part of the convex part in the thickness direction provided to the outer circumferential lining part. Thus, even if warpage occurs in the core metal, the convex part and the outer circumferential side surface of the core metal can be reliably opposed, and sealability by the convex part can be ensured.

From the fourth aspect of the invention, each side surface part is formed of a tilted surface having an angle equal to or smaller than 10 degrees with respect to the pressure-contact seal direction of the tip seal surface. Thus, variations in the seal width after lining formation are suppressed, and the outer circumferential seal part having a uniform seal width can be easily formed on the outer circumference of the valve disk. When the valve is closed and sealed, the outer circumferential seal part exerts a constant seal surface pressure over the outer circumference of the valve disk to reliably inhibit fluid leakage.

From the fifth aspect of the invention, even if a tilt or movement occurs on a valve disk side and a stem side in a state in which a fluid pressure is applied by the one set of washers, the attachment state between the valve disk side and the stem side is maintained to maintain smooth rotational operability. In this case, the washer is formed of a combination of convex and concave shapes, and a surface pressure equivalent to that before a tilt or movement occurs from the stem side to the boss part of the valve disk is applied, thereby ensuring sealability between these boss part and the body side and reliably inhibiting leakage even if the valve disk side and the stem side are tilted or moved.

From the sixth aspect of the invention, even if the convex-shaped washer and the concave-shaped washer are tilted or positionally deviated to each other, the convex spherical surface and the concave spherical surface are closely attached by the spring-back force of the spring. Thus, a uniform surface pressure acts over a wide range of contact positions, and excellent sealability can be exerted between the boss part and the body side.

From the seventh aspect of the invention, the lined butterfly valve is excellent in chemical resistance and heat resistance. The front/back-side lining part of the valve disk is provided on each of the front and back sides of the core metal in which no occurrence of warpage is assumed, so as to have a thickness obtained by adding a predetermined lining thickness and a thickness equal to a maximum warp width assumed on a valve blade side of the core metal at at least an outer circumferential end position of the core metal. Thus, even if warpage occurs in the core metal in practice, a lining portion with at least the predetermined lining thickness is ensured on the front and back sides of the valve disk. On the other hand, the outer circumferential lining part has a thickness obtained by adding the predetermined lining thickness and a lining thickness as a predetermined crush thickness. Thus, a lining portion with at least the predetermined lining thickness is ensured also on the outer circumferential side of the valve disk. Thus, even if the valve is provided to have a large diameter, a lining layer with a thickness sufficient for the core metal can be ensured to prevent permeation and penetration of the fluid. With this, without finely setting the shape of the core metal, it is possible to form the front/back-side lining part and the outer circumferential lining part each in a predetermined shape and, in particular, it is possible to easily form the outer circumferential side with the predetermined thickness and the predetermined width. With this outer circumferential side having a thickness and seal width required to ensure sealability, leakage from the outer circumferential side of the valve disk is prevented when the valve is closed and sealability can be exerted over the entire circumference of the valve disk.

From the eighth aspect of the invention, the stem or the stem jig is inserted and fixed in advance in the core metal, and this stem or the stem jig is held so as not to move the core metal, and the core metal is fixed in the space of molding a die for molding the lining layer (metal mold). The material of the lining layer is introduced into the molding space to form the lining layer. Thus, the core metal can be arranged at a correct position in the lining layer whose outer shape is defined in advance by the die (metal mold). Thus, it is possible to reliably form a lining layer having a necessary thickness to prevent permeation of the fluid even if warpage occurs in the core metal.

BRIEF DESCRIPTION OF DRAWINGS

FIG. 2(*a*) is a partially-cutout perspective view of a valve disk. FIG. 2(*b*) is a central cross-sectional view of the valve disk.

FIG. 4(*a*) is a partially-omitted cross-sectional view of the valve disk in which no warpage is present in the core metal. FIG. 4(*b*) is a partially-omitted cross-sectional view of the valve disk in which warpage occurs in the core metal. FIG. 4(*c*) is a comparative example of a partially-omitted cross-sectional view of the valve disk.

DESCRIPTION OF EMBODIMENTS

Figure 1:
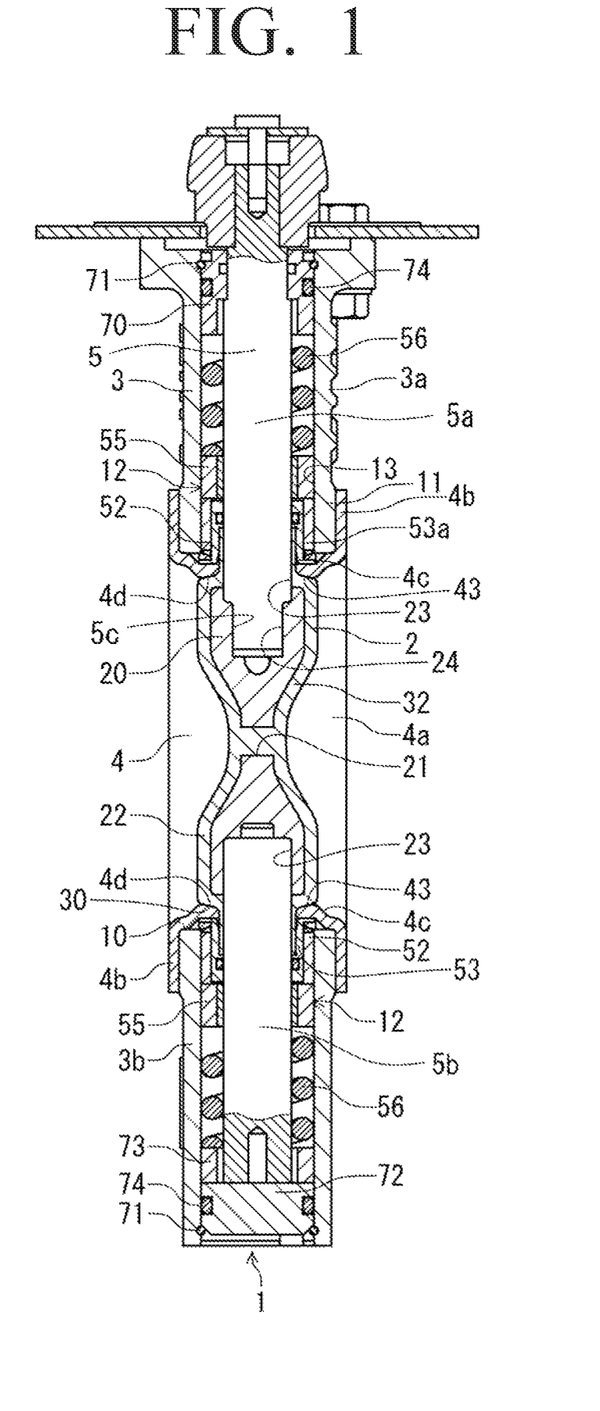
FIG. 1 is a central cross-sectional view depicting an embodiment of a lined butterfly valve of the present invention.

An embodiment of a lined butterfly valve in the present invention is described in detail below based on the drawings. FIG. 1 depicts a central cross-sectional view of an embodiment of the lined butterfly valve of the present invention, FIG. 2(a) and FIG. 2(b) depict a valve disk, and FIG. 3 depicts an enlarged sectional view of an A portion in FIG. 2(b).

In the drawings, the lined butterfly valve (hereinafter referred to as a valve main body 1) is provided to have, for example, a large diameter with a nominal diameter on the order of 350 A to 600 A, and is used as part of a pipeline in semiconductor manufacturing plants and food-related industries. The valve main body 1 includes a valve disk 2, a substantially cylindrically-shaped body 3, a seat liner 4, and a stem 5, and this stem 5 is formed of an upper stem 5a and a lower stem 5b.

The body 3 is molded from cast iron such as, for example, ductile iron, is provided to have an upper body 3a and a lower body 3b in a vertically dividable mode, and is provided so as to be integrally fixable with a bolt not depicted. The body 3 is provided with a flow path port 10 and a flange 11. An inner circumferential side of the body 3 including these is covered with a seat liner 4. On a shaft-insertion side of each of the stem 5 of the upper body 3a and the lower body 3b, a shaft-mounting part 12 is formed. Inside this shaft-mounting part 12, a shaft-mounting hole 13 is provided. Into the respective shaft-mounting holes 13, the upper stem 5a and the lower stem 5b are inserted. On a lower part of the upper stem 5a, a polygonal rectangular part 5c is formed.

The valve disk 2 has, on its center side, a substantially-disk-shaped core metal 20 formed of a metal material such as a stainless steel alloy. This core metal 20 is covered with a lining layer (lining part) 22. This lining part 22 includes front/back-side lining parts 32 provided on front and back sides, respectively, of the core metal 20, and an outer circumferential lining part 33 provided on an outer circumferential side of the core metal 20.

On top and bottom sides of the valve disk 2, stem insertion holes 23 are formed. In particular, in the stem insertion hole 23 on the top side, a rectangular hole part 24 is formed where the rectangular part 5c of the stem 5 can fit. In the stem insertion hole 23 on the top side, the upper stem 5a is inserted and attached so that the rectangular part 56c fits in the rectangular hole part 24. In the stem insertion hole 23 on the bottom side, the lower stem 5b is inserted. With these, the valve disk 2 is inserted inside the body 3 in a state with the upper stem 5a and the lower stem 5b being shaft-mounted, and can open and close a flow path inside the body by rotation of the upper stem 5a.

The lining part (lining layer) 22 is provided from, for example, a resin material such as a fluororesin of PFA (tetrafluoroethylene-perfluoro alkyl vinyl ether copolymer) or the like, and includes, in addition to the front/back-side lining parts 32 and the outer circumferential lining part 33 described above, a boss part 30 and a shaft-cylinder lining part on each of the upper and lower sides (top and bottom sides). The lining part 22 integrally covers the outer circumference on the front and back surfaces of the core metal 20 through communication parts 21 formed at appropriate positions on the core metal 20 and is formed in a state of being prevented from falling away from the core metal 20.

A seal portion of the lining part 22 of the valve disk 2 with the seat liner 4 is formed of the boss part 30 near each of the top and bottom sides and a valve blade part 31, which is a portion other than the boss part 30. With the boss parts 30, sealability on the top and bottom sides with the seat liner 4 is ensured from valve opening to valve-closed states. With the valve blade part 31, sealability on a valve blade side with the seat liner 4 is ensured in a valve-closed state. As described above, when the valve is closed, with the boss parts 30 and the valve blade part 31, sealability with the seat liner 4 can be exerted over the entire inner circumferential surface.

Here, when the lining part 22 is formed, as the valve main body 1 (core metal 20) has a larger diameter, a larger warp tends to occur at the time of casting from the valve blade side of the core metal 20 centering on a rotation axis. When lining process is performed thereafter, a portion of the core metal 20 near the valve blade side tends to be deformed as being warped downward by its self-weight.

Figure 2:
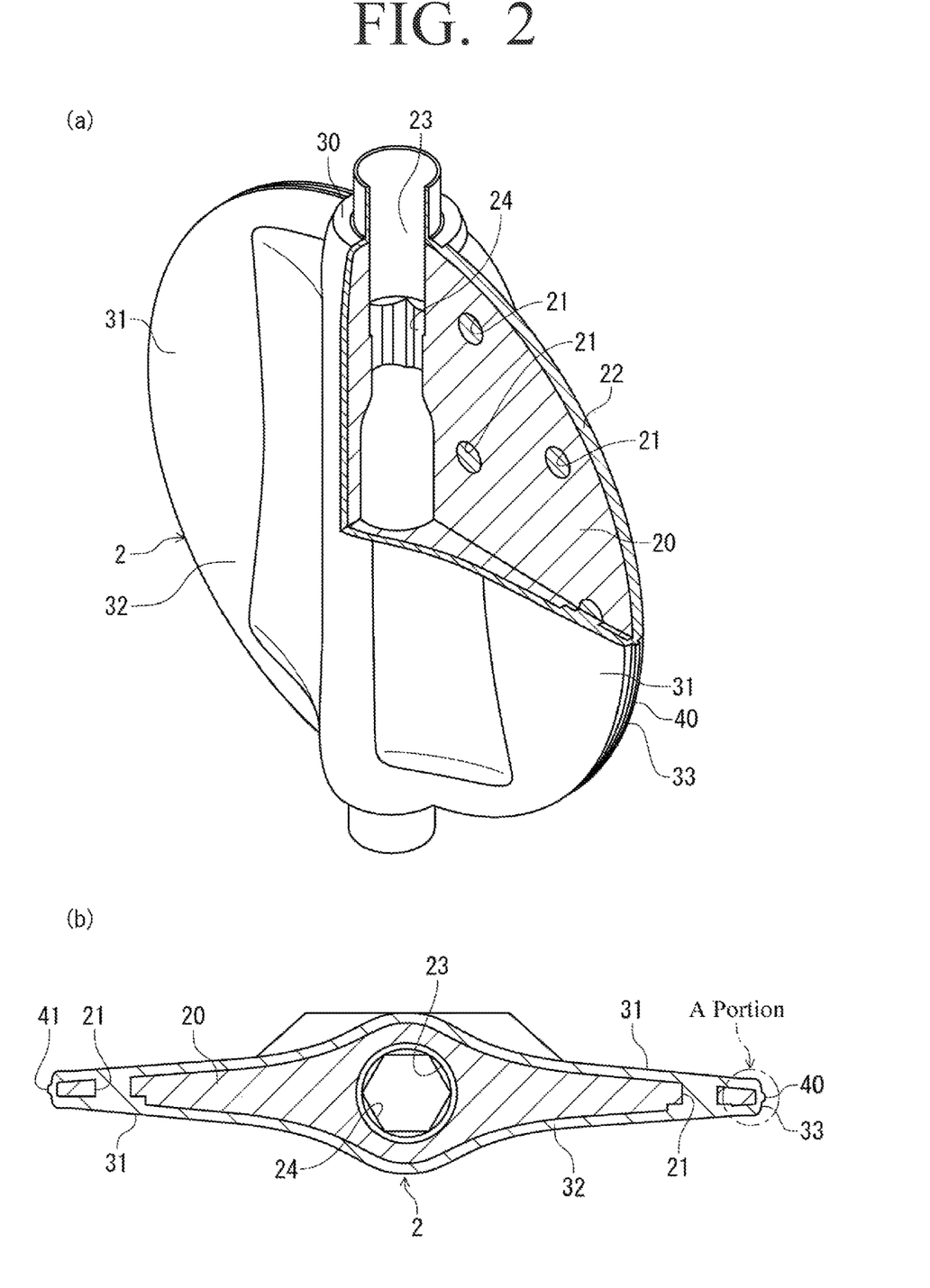
Figure 3:
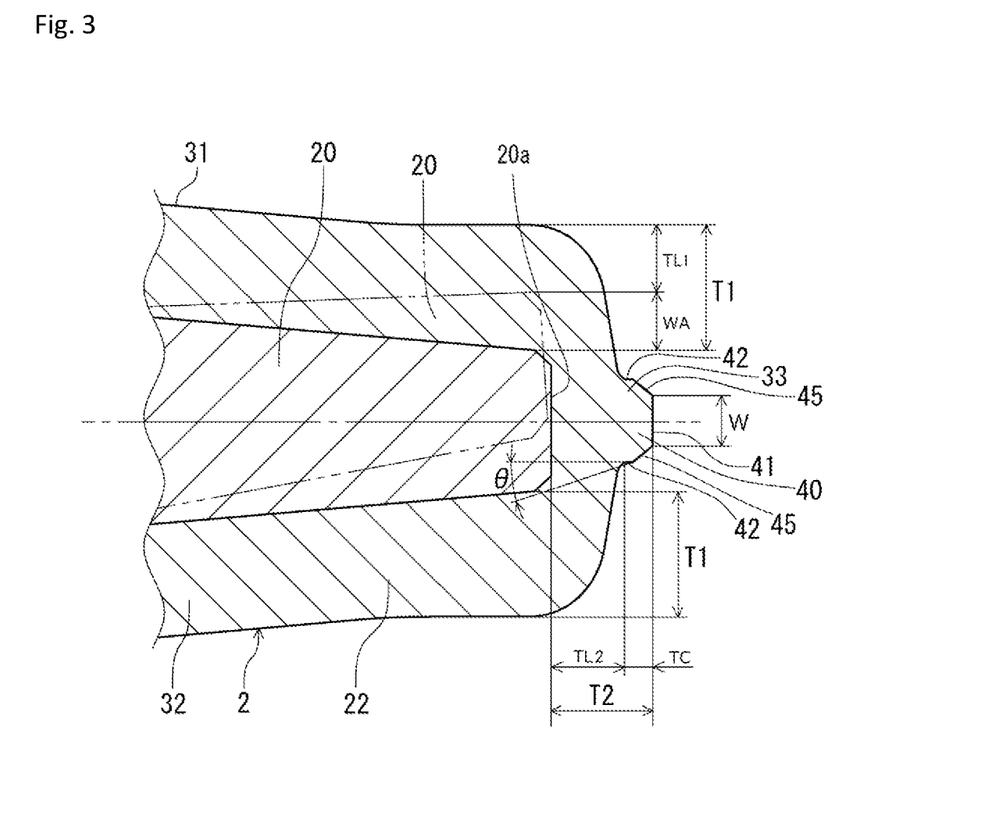
FIG. 3 is an enlarged sectional view of an A portion of FIG. 2(*b*), with a portion of the end of the core metal shown in FIG. 4(*b*) superimposed thereon.

By contrast, in FIG. 2 and FIG. 3, the front/back-side lining parts 32 are provided to have, on each of the front and back sides of the core metal 20 presumed to have no occurrence of warpage, a thickness T1 obtained by adding a predetermined lining thickness TL1 and a thickness equal to a maximum warp width WA assumed on the valve blade side of the core metal 20, at least a position on an outer circumferential side of the core metal 20. With these front/back-side lining parts 32, the front and back surfaces are reliably covered also on the valve blade side of the core metal 20. These FIG. 2 and FIG. 3 are drawings in which no warpage occurs in the core metal 20, which is, so to say, in an ideal state. In practice, this state may not occur and warpage may occur in the core metal 20. A mode in which warpage occurs in the core metal 20 will be described further below based on FIG. 4. Also, while the front/back-side lining parts 32 having a uniform thickness are provided on the front and back sides of the core metal 20 in the present example, this is not necessarily restrictive. Since warpage of the core metal 20 tends to be larger toward the valve blade side, the thickness may be increased toward the valve blade side accordingly.

Specifically, in the case of a large-diameter butterfly valve having a nominal diameter on the order of 350 A to 600 A as in the present example, the predetermined lining thickness TL1 of each of the front and back sides of the core metal 20 is desirably at least equal to or larger than 3 mm, and is provided to be on the order of 3 mm. On the other hand, the thickness equal to the maximum warp width WA assumed on the valve blade side of the core metal 20 is provided, with the maximum warp width near the valve blade centering on the rotation axis of the core metal 20 being assumed to be 2 mm, to be on the order of 2 mm, accordingly, on each of the front and back sides of the core metal 20. With these, the front/back-side lining part 32 is provided, on each of the front and back sides of the core metal 20 in which no occurrence of warpage is assumed, to have the thickness T1 on the order of 5 mm, which is a sum of the predetermined lining thickness TL1 of 3 mm and the thickness of 2 mm equal to the maximum warp width WA assumed on the valve blade side of the core metal.

On the other hand, the outer circumferential lining part 33 is provided to have a thickness T2 on the outer circumferential side of the core metal 20 from an outer circumferential end of the core metal 20 to a tip seal surface 41 of an outer circumferential end of the valve disk 2. This thickness T2 consists of a thickness obtained by adding a predetermined lining thickness TL2 on the outer circumferential side of the core metal 20 and a predetermined crush thickness TC. With this outer circumferential lining part 33, the outer circumferential side of the core metal 20 is covered.

Specifically, the predetermined lining thickness TL2 on the outer circumferential side of the valve disk 2 is provided to be on the order of 3 mm, the predetermined crush thickness TC is added to this predetermined lining thickness TL2 and, with these, the outer circumferential lining part 33 is configured. In the present example, the predetermined crush thickness TC is set to be on the order of 1 mm and, with these predetermined lining thickness TL2 and predetermined crush thickness TC, a necessary thickness is allocated on the outer circumferential side of the valve disk 2 as a thickness for pressure-contact with the seat liner 4 and a crush margin.

Here, the "predetermined lining thickness" is a minimum thickness of the lining layer required so as not to let a fluid having a possibility of being in contact with the valve disk 2 permeate through the core metal 20, and is varied depending on the material of the lining layer and the type of the fluid. Note that this "minimum thickness" is not required to be a value proved by a theory, verification, and so forth, and may have a customary value required at minimum in order not to let the fluid penetrate, based on the experiments of a person skilled in the art. Also, the "predetermined crush thickness" is an amount of irreversible crush that can occur when the seal portion of the valve disk 2 repeatedly makes contact with the seat liner 4 to be crushed when the valve disk 2 is opened and closed. This "predetermined crush thickness" can be set in consideration of the size of the valve disk 2, the material of the lining part 22, the amount of crush of the seal portion, and so forth.

Furthermore, "the maximum warp width assumed near the valve blade of the core metal 20" is a deviation width of a design value from an end portion of the core metal 20 regarding warpage mainly near the valve blade having a possibility of occurrence in casting the core metal 20 or the like, when a maximum warp occurs in a predicted range.

On a seal side of the outer circumferential lining part 33, a convex part (annular convex part 40) is provided to have a predetermined height. This annular convex part 40 protrudes to the outer circumferential side of the valve disk 2 and is substantially annularly formed contiguously to the outer circumference of this valve disk 2. On an end face of this annular convex part 40 on the outer circumferential side of the valve disk 2, the tip seal surface 41 is formed. The tip seal surface 41 is provided to have a predetermined seal width W.

In this case, in consideration of also irreversible leakage occurring as a result of a contact with the valve seat of the seat liner 4, the annular convex part 40 is set to have a predetermined height (predetermined crush thickness) allowing sufficient sealability to be maintained. As a result, in the outer circumferential lining part 33, a layer having a predetermined lining thickness is formed on the outer circumferential side of the core metal 20, and on its further outer circumferential side, the annular convex part 40 as a predetermined crush thickness is formed. With this structure, while the predetermined lining thickness is reliably ensured on the outer circumferential side of the core metal 20, a minimum-required outer circumferential seal part can also be formed.

The predetermined seal width W means a large width required for the tip seal surface 41 as a main seal portion with the seat liner 4 of the annular convex part 40 to obtain sufficient sealability. This predetermined seal width W can also have a customary value for a person skilled in the art.

The annular convex part 40 of the present example is formed to have a height on the order of 1 mm with the predetermined seal width W on the order of 3 mm. The entire outer circumferential lining part 33 is provided to have a thickness on the order of 4 mm, which is a sum of the predetermined lining thickness (3 mm) and the predetermined crush thickness (1 mm).

In the sectional view of the valve disk 2 of FIG. 3, a side surface part 42 is provided on both sides (upper and lower sides in the drawing) toward the tip seal surface 41 of the annular convex part 40, and each side surface part 42 is formed of a tilted surface tilted with respect to a pressure-contact seal direction of the tip seal surface 41. An angle θ of the tip seal surface 41 with respect to the pressure-contact seal direction is provided to be equal to or smaller than 10 degrees.

That is, when the lining layer (lining part 22) is formed on the core metal 20, at the time of forming the lining part 22, the annular convex part 40 is formed in advance significantly higher (larger to a right direction in FIG. 3) than a scheduled height and, after forming, can be cut at a position with a height required for the annular convex part 40. Here, if the angle θ is equal to or smaller than 10 degrees, both of the side surface parts 42 of the annular convex part before cutting become nearly parallel to each other, and a change of the width due to the cutting position between both of the side surface parts 42 can be decreased. Thus, the seal width W required for the tip seal surface 41 can be formed.

In FIG. 3, while the thickness of the front/back-side lining part 32 (thickness from the surface of the core metal 20 to the outer surface of the lining part 22) is larger than the thickness of the outer circumferential lining part 33, the thickness of the lining part from the front/back-side lining part 32 over the annular convex part 40 is more preferably uniform. If the thickness of the lining part has a difference, at the time of forming the lining part, a contraction difference occurs due to a difference in thickness, and stress concentrates on the thinnest portion, which possibly becomes a portion where rupture tends to take place. In particular, while a root part of the annular convex part 40 is a portion where stress tends to concentrate, by making the thickness from the front/back-side lining part 32 via the outer circumferential lining part 33 to the annular convex part 40 uniform in this manner, stress concentration due to a difference in thickness tends not to occur, and rupture of the lining part 22 and so forth can be easily suppressed.

Between the tip seal surface 41 and both of the side surface parts 42, an annular C-surface part 45 is formed. Thus, with the C-surface part 45 (C-chamfer) provided, an excessive force is prevented from being applied to part of the annular convex part 40 when the annular convex part 40 makes contact with the seat liner 4. Furthermore, by setting the size and angle of the C-surface part 45 as appropriate, the seal width W of the tip seal surface 41 can also be set to have any size.

With the above-described lining part 22 formed on the valve disk 2, even if warpage or flexure occurs in the core metal 20, the thickness T1 of the front/back-side lining part 32 and the thickness T2 in the outer circumferential lining part 33 and the seal width W serve as a size reliably exerting sealability when the valve is closed. Furthermore, at this time, the outer circumferential lining part 33 is suppressed to have a minimum-required thickness for maintaining sealability.

Figure 4:
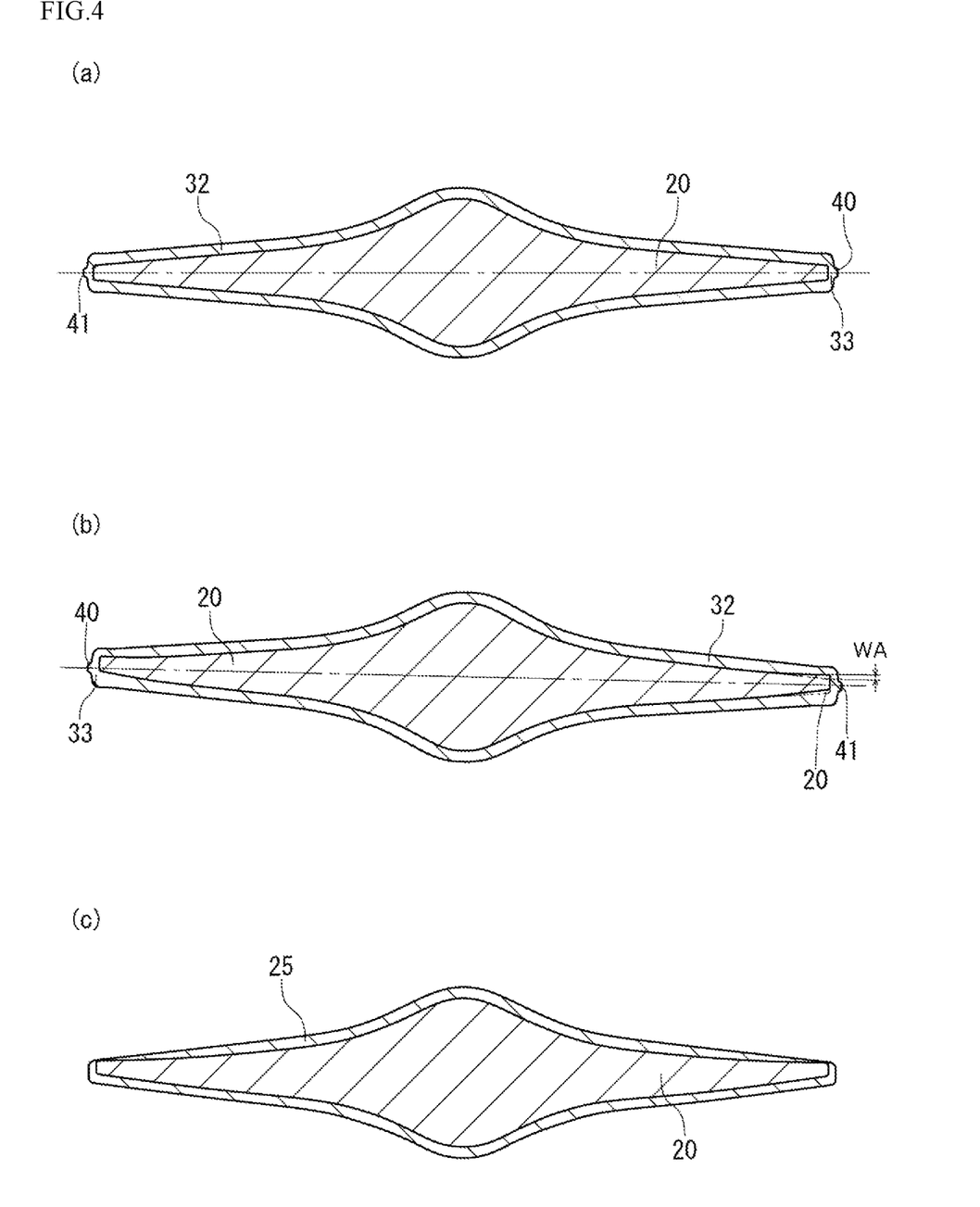

With reference to FIG. 4, a case is described below in which warpage or flexure occurs in the core metal 20. In the drawing, a partially-omitted sectional view of the valve disk is depicted. FIG. 4(a) depicts a state in which no warpage is present in the core metal of the present embodiment, FIG. 4(b) depicts a state in which warpage occurs in the core metal of the present embodiment, and FIG. 4(c) depicts a comparative example.

In FIG. 4(a), a state is depicted in which the front/back-side lining part 32 is formed to have a uniform thickness with respect to the front and back sides of the core metal 20 and the outer circumferential lining part 33 is formed to have a uniform thickness on the outer circumferential side. In this case, these front/back-side lining part 32 and the outer circumferential lining part 33 are each ensured to have a sufficient thickness.

As depicted in FIG. 4(*b*), even if warpage occurs upward, since the front/back-side lining part 32 has a thickness obtained by adding the thickness of the maximum warp width of the core metal 20 assumed in advance to the predetermined lining thickness, at least the predetermined lining thickness is ensured on the front/back-side lining part 32 on an upper surface side of the core metal 20, and at least the predetermined lining thickness is also ensured on the outer circumferential lining part 33. With these, permeation and penetration of the fluid can be prevented, and sealability with respect to the seat liner 4 when the valve is closed can be ensured.

In the case of a lining part 25 provided in the comparative example of FIG. 4(*c*), the lining thickness equal to the maximum warp width assumed on the valve blade side is not added on the front and back surfaces of the core metal 20. On the outer circumferential side of the core metal 20, the lining thickness having the predetermined seal thickness is not added. In this case, the front/back-side lining part on the upper surface side is short of the predetermined lining thickness. In particular, in this example, since the core metal 20 is exposed from an upper part of the front/back-side lining part 25, permeation and penetration of the fluid cannot be prevented, and the thickness of the outer circumferential lining part is not sufficient. Thus, it is difficult to ensure sealability when the valve is closed.

When the valve disk 2 of the present embodiment is applied to the butterfly valve, the annular convex part 40 is crushed between itself and a seal surface on a body side, and sealability is exerted. Here, to obtain favorable sealability, it is preferable that an outer circumferential side surface part 20*a* of the core metal 20 be reliably positioned so as to be opposed to the annular convex part 40. With this, the state is preferably such that the annular convex part 40 is supported by the core metal 20. Also, as described above, while warpage and flexure tend to occur in the core metal 20 as the diameter is larger, if the outer circumferential side surface part 20*a* of the core metal 20 is deviated from the annular convex part 40 due to warpage or flexure of the core metal 20, there is a possibility that sealability cannot be sufficiently obtained.

Thus, in the present example, the outer circumferential side surface part 20*a* of the core metal 20 has a width that can be opposed to a center part of the annular convex part 40 in a thickness direction even if warpage occurs with the maximum warp width assumed on the valve blade side of this core metal 20. For example, if warpage of the core metal 20 is assumed to occur on the order of 2 mm at maximum, the width of the outer circumferential side surface part 20*a* is preferably set larger than 4 mm. Even if the core metal 20 warps by 2 mm at maximum, the center part of the annular convex part 40 is at a position opposed to the outer circumferential side surface part 20*a* of the core metal 20. Thus, a decrease in sealability due to warpage or flexure of the core metal 20 can be prevented.

Figure 6:
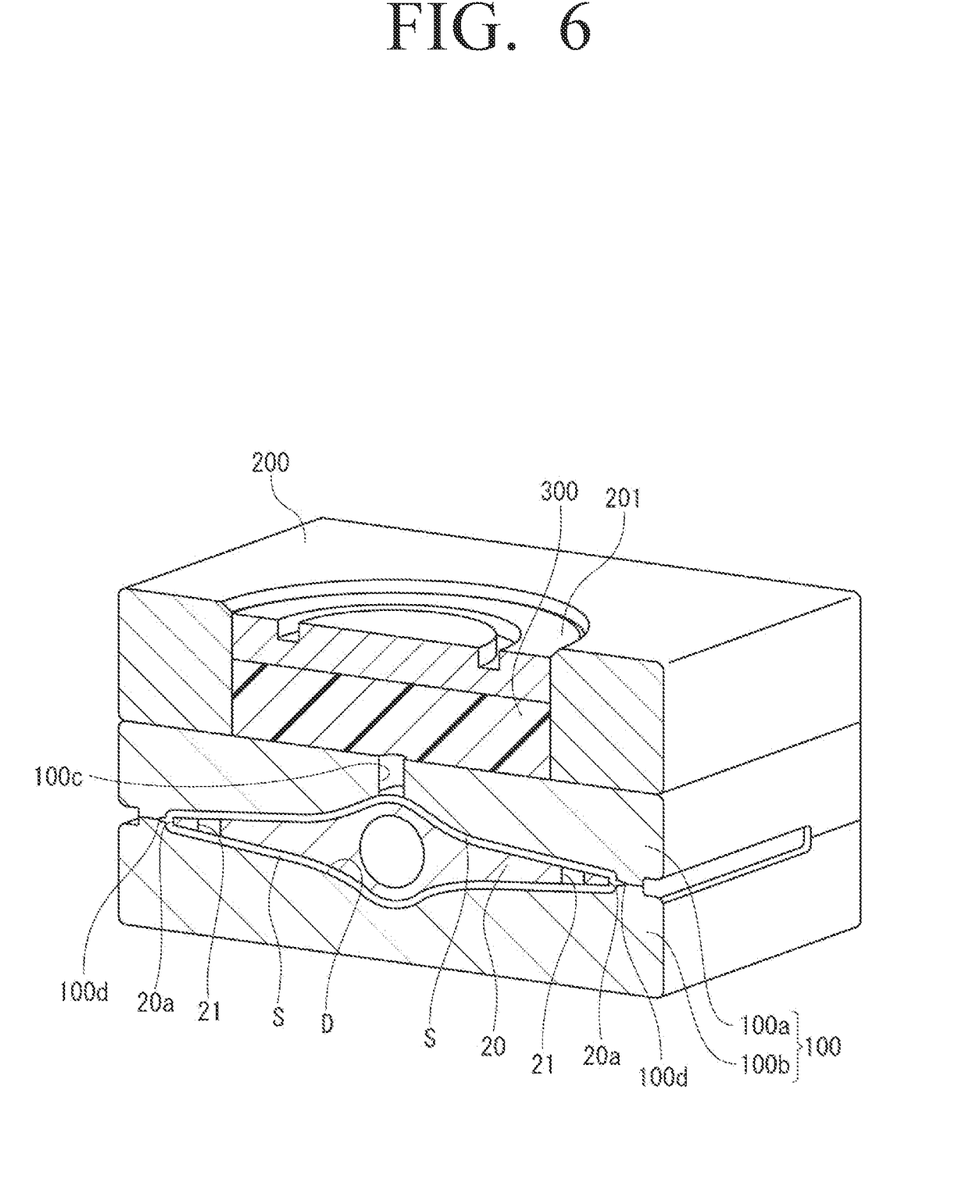
FIG. 6 is a schematic explanatory drawing depicting a molding die of the butterfly valve.

The above-described valve disk 2 including the lining part 22 on the surface of the core metal 20 can be manufactured as follows, for example. FIG. 6 is a schematic explanatory drawing depicting a molding die of the butterfly valve. Although not depicted, a stem or a stem jig is inserted into a stem insertion hole to hold a lower die with the stem or the stem jig.

First, the core metal 20 is prepared, and the stem 5 or an upper/lower-part stem jig (not depicted) or the like having the same shape as the stem is inserted into the stem insertion hole 23 of each of the upper stem 5*a* and the lower stem 5*b* of this core metal 20 to fix the core metal 20 (for the stem insertion holes 23 of the core metal 20, refer to FIG. 1 and so forth).

Next, from a state of being substantially horizontally laid down, the core metal 20 is arranged in a predetermined molding area D for resin molding in a lower metal mold 100*b* of a die for molding (metal mold) 100 while the upper and lower stems 5*a* and 5*b* or upper/lower-part stem jigs (hereinafter, stem jigs) are held. Here, the upper and lower stems 5*a* and 5*b* or the stem jigs are fixed with a holding member or the like so that the core metal 20 does not move in a rotating direction. Here, the holding member may be fixed in any method as long as the core metal 20 does not rotate. For example, the holding member may fix the upper and lower stems 5*a* and 5*b* or the stem jigs so as to interpose them from both sides, or may be integral with the metal mold, with stem-holding concave parts provided in the metal mold.

Next, from above the lower metal mold 100*b*, an upper metal mold 100*a* is placed to fix the metal mold 100 with a fixing member (not depicted) or the like. Here, between the upper metal mold 100*a* and the lower metal mold 100*b* and an area where the core metal 20 is arranged, a space S is provided to form the lining part 22 around this core metal 20.

In FIG. 6, after the inside of a pot 200 is filled with a resin material 300, the resin material 300 is extruded by an extruding member 201, and the resin material 300 is infused (introduced) into the inside of the space S through an infusion port 100*c* provided in the metal mold 100. This resin material 300 is cured to form the lining part 22 which covers the core metal 20.

Also, the metal mold 100 is provided with an annular step part 100*d*. The resin material 300 is injected into this annular step part 100*d*, and the annular convex part 40 can be formed on the outer circumferential side of the lining layer 22 of the core metal 20.

After the resin material is sufficiently cured, the core metal 20 with the lining layer formed is taken out from the metal mold 100, unnecessary portion of the annular convex part 40 formed on the outer circumference of the valve disk is cut out, and thereby a lined butterfly valve including the tip seal surface 41 having the predetermined seal width W can be manufactured.

Also, in the above-described method, by fixing and holding the upper and lower stems 5*a* and 5*b*, the stem jig, or the like, the core metal 20 can be arranged at an accurate position in the molding area D in the metal mold 100. Thus, distortion, deviation, and so forth when the lining layer is formed can be prevented, and the lining part 22 having a necessary thickness can be easily formed.

In the present example, in particular, in the case of a butterfly valve having a large diameter, warpage and flexure tend to occur in the core metal 20 more than in a butterfly valve having a small diameter. To form the lining part 22 having a necessary thickness even if warpage or flexure occurs in the core metal, the shape of the lining part 22 is set to satisfy a predetermined condition. At the time of forming this lining part 22, it is particularly important to accurately align the position of the core metal 20 in the molding area in the metal mold. In the above-described method, by fixing and holding the upper and lower stems 5*a* and 5*b*, the stem jig, or the like fixed to the core metal 20, accurate alignment of the core metal 20 can be made in the metal mold 100.

Figure 5:
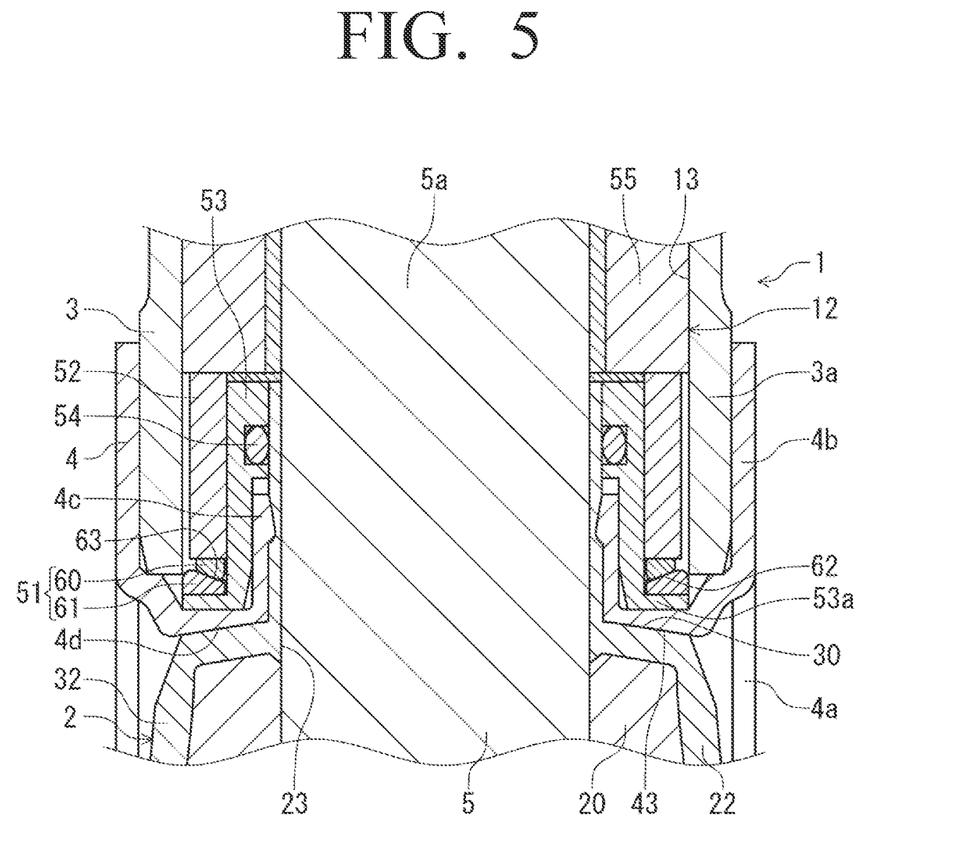
FIG. 5 is a partially-enlarged sectional view depicting a portion near a boss surface of FIG. 1.

In FIG. 5, the boss part 30 on the top/bottom side of the valve disk is arranged in a state of being pressure-contact sealed to the boss surface 4d formed on the top/bottom side of the seat liner 4 attached to the body 3. With these boss unit 30 and the boss surface 4d, sealability in a boss portion from a valve opening state to a valve-closed state is ensured.

In FIG. 1, the seat liner 4 is provided from a resin material such as PFA, which is identical to the same material as that of the lining part 22 of the valve disk 2 so as to have a predetermined material thickness and, as described above, is provided to cover the inner circumference side of the body 3 so as to allow high anti-corrosion and heat resistance characteristics to be exerted. The seat liner 4 has an annular part 4a attached to an inner circumferential side of the body 3 and flange parts 4b formed to protrude from an outer circumferential edge at both ends of this annular part 4a. At the insertion positions of the upper and lower stems 5a and 5b of the annular part 4a, cylindrical lining parts 4c, 4c are integrally formed to protrude in a direction of attachment of the stem 5. Into these cylindrical lining parts 4c, the upper and lower stems 5a and 5b are inserted.

Provided in each of the above-described shaft-mounting parts 12 of the body 3 where the stem on the upper/lower side is inserted are a washer 51, a ring body 52, a sealing bushing 53, an O ring 54, a cylindrical bearing 55. Furthermore, a spring 56 formed of a coil spring is inserted on the upper/lower side of each shaft-mounting part 12. On the upper/lower part side, the valve disk 2 is rotatably attached inside the body 3 in a state of being covered with the lining part 22 and in a state of being shaft-sealed with the shaft-mounting part 12.

In each of the upper and lower shaft-mounting parts 12, one set of washers 51 with opposed to each other is attached in a direction of insertion of the upper stem 5a/lower stem 5b. The one set of washer is formed of a combination of concave and convex shapes so that, even if a deviation or tilt occurs between the stem 5 and the valve disk 2, the state of the surface pressure applied from the stem 5 (upper and lower stems 5a, 5b) side to the boss part 30 of the valve disk 2 is substantially equivalent to a state in which this does not occur.

Specifically, each washer 51 is formed of a convex-shaped washer 60 and a concave-shaped washer 61. The convex-shaped washer 60 has a convex spherical surface 62 on one surface side, and the concave-shaped washer 61 has a concave spherical surface 63 with which this convex spherical surface 62 is in surface contact on one surface side. By a spring-back force of the spring 56 inserted in the shaft-mounting part 12, these convex-shaped washer 60 and concave-shaped washer 61 are attached in a pressurized state in a mutually opposed direction. The attachment structure of this washer 51 is provided to each of the upper and lower shaft-mounting parts 12 in a symmetrical attachment state.

When a fluid pressure is applied to the valve disk 2, the valve disk 2 moves to its direction, and it is considered thereby that the stem 5 (the upper stem 5a and the lower stem 5b) is tilted centering on a center position of each of the upper and lower bearings 55. Thus, in view of sliding with the spherical surface along the tilt of the stem 5, by taking the center position of each the upper and lower bearings 55 as the center position of a sphere, a virtual spherical surface formed at the position of the washer 51 is matched with the spherical surface where the convex-shaped washer 60 and the concave-shaped washer 61 are opposed.

The stem 5 is tilted by, at maximum, a space that is present around its tip portion side and between itself and a space on the valve disk 2 side. Thus, the convex spherical surface 62 and the concave spherical surface 63 are formed to each have a shape to the extent of being able to support this tilt. For example, when the stem 5 is tilted at an angle of 1 degree at maximum, the convex spherical surface 62 and the concave spherical surface 63 each have a spherical surface shape, accordingly, supporting a tilt at an angle of 1 degree at maximum.

In the present example, the virtual spherical surface has a radius of 110 mm, and with this radius, the convex spherical surface 62 and the concave spherical surface 63 are each formed. With this, even if the stem 5 (the upper stem 5a and the lower stem 5b) is tilted to cause a deviation or tilt to occur between this stem 5 and the valve disk 2, the surface pressure of the tilt of the bearing 55 is uniformly transmitted from the convex spherical surface 62 to the concave spherical surface 63.

The convex spherical surface 62 and the concave spherical surface 63 are desired to be formed to be in a mode in which they easily slide over each other. In the present embodiment, the inner and outer circumferential diameters of the convex-shaped washer 60 are provided to be slightly smaller than the inner and outer circumferential diameters of the concave-shaped washer 61, and an appropriate space is provided on each of the inner and outer circumferential sides of the convex-shaped washer 60 (not depicted). Thus, the convex-shaped washer 60 can easily swing in a circumferential direction with respect to the concave-shaped washer 61.

The bearing 55 is arranged between the spring 56 and the ring body 52. With this bearing 55, the upper stem 5a and the lower stem 5b are each supported near the O ring 54 so as to be rotatable an in an aligning state.

The ring body 52 is provided to have a cylindrical shape made of a stainless steel allowing a position of the boss part 30 of the valve disk 2 near the outer circumference to be strongly pressurized from an upper side. While the valve disk 2 is made in a rotatable state, this ring body 52 is provided to allow the spring-back force of the spring 56 to be transmitted through the bearing 55 to a valve disk 2 side.

On an upper side of the upper body 3a, a bearing member 70 rotatably supporting the upper stem 5a is arranged as being locked with a retainer ring 71. With this bearing member 70, the spring 56 is retained in a state of springing back downward.

On the other hand, on a lower body 3b side, a top member 72 is arranged as being locked with the retainer ring 71. On this top member 72, a bearing member 73 is placed which rotatably supports the lower stem 5b. Via this bearing member 73, the spring 56 is retained in a state of being able to spring back upward. With the above-described bearing members 70 and 73 and top member 72, the upper and lower springs 56, 56 are spring back to two directions of the valve disk 2. On the inner and outer circumferences of the bearing member 70 and the top member 72, dustproof and waterproof O rings 74, 74 are respectively attached.

The sealing bushing 53 is formed of a resin material such as carbon-fiber-impregnated PTFE (polytetrafluoroethylene), and is provided as a seal portion between the ring body 52, and the lining part 22 and the seat liner 4. On a lower side of the sealing bushing 53, an annular flange part 53a is formed so as to be bent to an outer circumferential direction. An end face side of the ring body 52 is provided so as to be able to make contact with a flange part 53a. With this, the ring body 52 pressurizes the seat liner 4 via the flange part 53a.

With the above-described structure, in the valve main body 1 of FIG. 1, by pressurizing, via the ring body 52, the seat liner 4 positioned at the boss part 30 on the top/bottom of the valve disk 2 with the spring-back force of the spring 56 provided to the shaft-mounting hole 13 of the body 3, sealability of each of these top and bottom portions is ensured.

Note that, in the above-described embodiment, a partial thickness in accordance with warpage of the core metal 20 may be further added to the front/back-side lining part 32 and the outer circumferential lining part 33 or a thickness corresponding to the maximum warp width assumed on the entire surface of the core metal 20 may be added thereto.

The washer 51 can also be arranged at any position in the shaft-mounting part 12. As long as a mode is such that the convex-shaped washer and the concave-shaped washer can slide over each other, their shape can be a taper shape other than the spherical shape, and they can be provided to have a reversed vertical positional relation. Also, these washers in one set may be provided in a mode of not swinging.

While a coil spring is used as the spring 56, this is not meant to be restrictive and, for example, a disc spring or the like may be used.

Next, the operation of the lined butterfly valve of the present invention in the above-described embodiment is described. In FIG. 1 to FIG. 3, the valve main body 1 includes the lining part 22 including the front/back-side lining parts 32 and the outer circumferential lining part 33, and the core metal 20 is covered with this lining part 22. Thus, chemical resistance and heat resistance can be maintained even if the diameter of the valve main body 1 is increased to be a nominal diameter on the order of 350 A to 600 A.

In this case, on each of the front and back sides of the core metal 20, the front/back-side lining part 32 is set to have the thickness T1 of 5 mm obtained by adding the predetermined lining thickness of 3 mm and the thickness of 2 mm equal to the maximum warp width assumed on the valve blade side of the core metal 20. Thus, even if warpage occurs in the core metal 20 at the time of casting or lining process is performed with the lining molding die of FIG. 6 and the valve blade side flexes downward by its self-weight to be deformed, the necessary lining thickness can be applied to the front and back sides of the core metal 20. With the lining part 32, permeation and penetration of the fluid can be reliably inhibited to ensure chemical resistance and heat resistance.

On the other hand, the outer circumferential lining part 33 is set to have the thickness T2 of 4 mm obtained by adding the predetermine lining thickness of 3 mm on the outer circumferential side of the core metal 20 and the predetermined crush thickness of 1 mm, and the annular convex part 40 is formed on the seal side of the outer circumferential lining part 33. Thus, without finely setting the shape of the core metal 20, it is possible to easily form the outer circumferential seal part having the necessary seal width W, without consideration of the thickness and the taper shape of this core metal 20 on the outer circumferential end part side.

The predetermined seal width W of the annular convex part 40 is provided to be 3 mm, which is a width necessary for the valve disk 2 having the size as in the present embodiment. Thus, when the valve is closed, the outer circumferential lining part 33 including the annular convex part 40 is pressurized by the outer circumferential surface of the core metal 20, and the tip seal surface 41 of the annular convex part 40 is brought into pressure contact with the annular seal surface 43 on the inner circumference of the seat liner 4, thereby reliably preventing leakage.

Also, the outer circumferential side surface part 20a of the core metal 20 is formed to have a width that can be opposed to the center part of the annular convex part 40 in the thickness direction even if warpage occurs with the maximum warp width assumed on the valve blade side of this core metal 20. Thus, even if warpage of the core metal 20 is at maximum, the outer circumferential side surface part 20a and the center part of the annular convex part 40 are always opposed to each other. Thus, a decrease in sealability can be prevented even if warpage or flexure occurs in the core metal 20.

Furthermore, each of the side surface parts 42 of the annular convex part 40 is provided to be formed of a tilted surface so that the angle θ of the side surface part with respect to the pressure-contact seal direction of the tip seal surface 41 is 10 degrees. thus, the side surface part 42 of the annular convex part 40 is almost parallel in a relation with the pressure-contact seal direction of the tip seal surface 41. Thus, the annular convex part 40 is formed to be slightly long at the time of molding and its superfluous portion is cut out, thereby easily processing it with the predetermined seal width W.

As depicted in FIG. 5, the one set of washers 51 formed of the convex-shaped washer 60 and the concave-shaped washer 61 is inserted in each of the upper and lower shaft-mounting parts 12, and the convex spherical surface 62 and the concave spherical surface 63 are pressurized by the spring-back force of the spring 56. With this, even if the valve disk 2 moves and a tilt occurs in the stem 5, the convex spherical surface 62 slides with respect to the concave spherical surface 63 to cause the convex-shaped washer 60 to be tilted together with the stem 5. On the other hand, a predetermined orientation of the concave-shaped washer 61 is maintained. Thus, even if the pressurizing force by the spring 56 is applied so as to be tilted with respect to the boss surface 4d due to the tilt of the stem 5, the pressurizing force is converted by the washer 51 into a force in a direction perpendicular to the boss surface 4d. Without this washer 51, the tilted pressurizing force by the spring 56 is applied to the boss surface 4d, and the pressurizing force to the circular boss surface 4d does not match in the circumferential direction, and leakage may possibly occur at a weak portion. By contrast, the pressurizing force is converted by the washer 51 perpendicularly to the boss surface 4d, the force is uniformly applied in the circumferential direction of the boss surface 4d.

From the above description, when the valve is closed, sealability on both of a boss portion side of the valve disk 2 and a valve blade portion side other than the boss portion is ensured and, for example, even if the diameter of the valve main body 1 is increased to be a nominal diameter on the order of 350 A to 600 A, sealing can be improved over the entire circumference of the entire circumference of the valve disk 2.

While the embodiment of the present invention has been described in detail above, the present invention is not limited by the description of the embodiment and can be variously modified in a range not deviating from the spirit of the invention described in the claims of the present invention.

REFERENCE SIGNS LIST 1 valve main body
2 valve disk
3 body
4 seat liner
5 stem 5a upper stem
5b lower stem
12 shaft-mounting part
20 core metal
20a outer circumferential side surface part
22 lining part (lining layer)
23 stem insertion hole
30 boss part
32 front/back-side lining part
33 outer circumferential lining part
40 annular convex part (convex part)
41 tip seal surface
42 tilted surface (side surface part)
51 washer
56 coil spring (spring)
60 convex-shaped washer
61 concave-shaped washer
62 convex spherical surface
63 concave spherical surface
100 die for molding (metal mold)
100a upper metal mold
100b lower metal mold
T1, T2 thickness
W predetermined seal width
θ angle

The invention claimed is:

1. A lined butterfly valve comprising:
a body;
a stem rotatably mounted in the body; and
a valve disk provided rotatably inside the body via the stem, the valve disk including a core metal covered with a lining layer,
wherein the lining layer comprises a front/back-side lining part provided on each of a front side and a back side of the core metal, and an outer circumferential lining part provided on an outer circumferential side of the core metal,
wherein the front/back-side lining part is provided on each of the front and back sides of the core metal, so as to have a thickness obtained by adding a first predetermined lining thickness and a thickness equal to a maximum warp width on a valve blade side of the core metal at least at an outer circumferential end position of the core metal,
wherein the outer circumferential lining part has a thickness from an outer circumferential end of the core metal to a tip seal surface of an outer circumferential end of the valve disk obtained by adding a second predetermined lining thickness and a predetermined crush thickness,
wherein each predetermined lining thickness is a minimum thickness required so as to prevent a fluid from permeating through the core metal,
wherein the maximum warp width is a deviation amount due to a maximum warpage of the core metal that occurs during casting of the core metal or during a lining process, and
wherein the predetermined crush thickness is an amount of irreversible crush of a convex part on the outer circumference of the valve disk that occurs when the valve disk is opened and closed.

2. The lined butterfly valve according to claim 1, wherein the outer circumferential lining part has the convex part protruding to an outer circumferential side of the valve disk, the convex part substantially annularly formed contiguously protruding to an outer circumference of the valve disk, and an end face of the convex part on the outer circumferential side of the valve disk serves as the tip seal surface having a predetermined seal width.

3. The lined butterfly valve according to claim 2, wherein each side surface part of the convex part with respect to the tip seal surface is formed of a tilted surface having an angle equal to or smaller than 10 degrees with respect to a pressure-contact seal direction of the tip seal surface.

4. The lined butterfly valve according to claim 2, wherein the core metal has an outer circumferential side surface part on its outermost circumference, and the outer circumferential side surface part has a width such that the outer circumferential side surface part can oppose a center part of the convex part in a thickness direction of the outer circumferential lining part.

5. The lined butterfly valve according to claim 4, wherein the valve blade side of the core metal is warped to the maximum warp width.

6. The lined butterfly valve according to claim 1, wherein one set of washers opposed to each other in a direction of insertion of the stem is attached in a shaft-mounting part where the stem is inserted, wherein the one set of washers is formed of convex and concave shapes so that a surface pressure applied from the stem side to a boss part formed in the valve disk can be substantially equal even when a deviation or tilt occurs between the stem and the valve disk.

7. The lined butterfly valve according to claim 6, wherein the one set of washers is formed of a convex-shaped washer including a convex spherical surface and a concave-shaped washer including a concave spherical surface with which the convex spherical surface is in surface contact, wherein the convex-shaped washer and the concave-shaped washer are attached in a pressurized state in a mutually opposed direction by a spring-back force of a spring inserted in the shaft-mounting part.

8. A method for manufacturing the lined butterfly valve according to claim 1, comprising:
inserting the stem or a stem jig having a same shape as the stem in stem insertion holes provided to the core metal at opposing positions of a valve blade part of the core metal to fix the core metal and the stem or the stem jig to each other;
arranging the core metal in a molding space of a die for molding the lining layer; and
in a state in which the stem or the stem jig is held so that the core metal is fixed so as not to move in the molding space, introducing a material for forming the lining layer into the molding space to form the lining layer on a surface of the core metal.

9. A lined butterfly valve comprising:
a body;
a stem rotatably mounted in the body; and
a valve disk provided rotatably inside the body via the stem, the valve disk including a core metal covered with a lining layer,
wherein the lining layer comprises a front/back-side lining part provided on each of a front side and a back side of the core metal, and an outer circumferential lining part provided on an outer circumferential side of the core metal,
wherein the front/back-side lining part has at least a first predetermined lining thickness on each of the front and back sides of the core metal and has, at least at an outer circumferential end position of the core metal, in total on the front and back sides, a thickness obtained by doubling a thickness obtained by adding a thickness equal to a maximum warp width on a valve blade side of the core metal to the first predetermined lining thickness, wherein the outer circumferential lining part has a thickness from an outer circumferential end of the core metal to a tip seal surface of an outer circumferential end of the valve disk obtained by adding a second predetermined lining thickness and a predetermined crush thickness, wherein each predetermined lining thickness is a minimum thickness required so as to prevent a fluid from permeating through the core metal, wherein the maximum warp width is a deviation amount due to a maximum warpage of the core metal that occurs during casting of the core metal or during a lining process, and wherein the predetermined crush thickness is an amount of irreversible crush of a convex part on an outer circumference of the valve disk that occurs when the valve disk is opened and closed.

* * * * *